(12) United States Patent
Andersen (10) Patent No.: US 6,908,099 B2
(45) Date of Patent: Jun. 21, 2005

(54) SYSTEMS AND METHODS FOR PROVIDING ALUMINUM HITCH COMPONENTS

(75) Inventor: John I. Andersen, Idaho Falls, ID (US)

(73) Assignee: Andersen Manufacturing, Inc., Idaho Falls, ID (US)

(*) Notice: Subject to any disclaimer, the term of this patent is extended or adjusted under 35 U.S.C. 154(b) by 0 days.

(21) Appl. No.: 10/306,988

(22) Filed: Nov. 27, 2002

(65) Prior Publication Data

US 2004/0100066 A1 May 27, 2004

(51) Int. Cl.$^7$ .................................. B60D 1/06
(52) U.S. Cl. ........................... 280/511; 72/255
(58) Field of Search ................. 280/511, 512, 280/513; 72/255

(56) References Cited

U.S. PATENT DOCUMENTS

| | | | | |
|---|---|---|---|---|
| 2,107,510 A | * | 2/1938 | Skinner et al. ............ | 29/527.5 |
| 3,321,950 A | * | 5/1967 | Gettig ........................ | 72/255 |
| 3,679,234 A | * | 7/1972 | Colliau ...................... | 280/511 |
| 3,774,952 A | * | 11/1973 | Zorn .......................... | 293/117 |
| 4,111,449 A | * | 9/1978 | Hancock .................... | 280/402 |
| 4,305,676 A | * | 12/1981 | Wallbank ................... | 403/130 |
| 5,240,266 A | * | 8/1993 | Kelley et al. ............... | 280/204 |
| 5,620,198 A | * | 4/1997 | Borchers .................... | 280/507 |
| 6,419,258 B1 | * | 7/2002 | Grote ......................... | 280/507 |
| 6,464,240 B1 | * | 10/2002 | Seksaria et al. ............ | 280/495 |
| 6,669,223 B2 | * | 12/2003 | Sekaria et al. ............. | 280/495 |
| 2002/0113405 A1 | * | 8/2002 | Moss et al. ............... | 280/416.1 |
| 2003/0038453 A1 | * | 2/2003 | Seksaria et al. ........... | 280/495 |
| 2003/0052472 A1 | * | 3/2003 | Moss et al. ............... | 280/415.1 |
| 2003/0090085 A1 | * | 5/2003 | Seksaria et al. ........... | 280/495 |
| 2003/0106348 A1 | * | 6/2003 | Nilges ......................... | 70/14 |

* cited by examiner

Primary Examiner—Kevin Hurley
(74) Attorney, Agent, or Firm—Kirton & McConkie; Dale E. Hulse; David B. Tingey (57) ABSTRACT

Systems and methods for using an extrusion, forging, casting and/or machining process to provide an aluminum hitch component with increased strength that eliminates encumbrances, such as rusting and fusing, associated with traditional hitch components. Accordingly, an extruded hitch is provided that includes increased tensile strength, does not rust, is lighter, and is more appealing to consumers.

18 Claims, 7 Drawing Sheets

SYSTEMS AND METHODS FOR PROVIDING ALUMINUM HITCH COMPONENTS

BACKGROUND OF THE INVENTION

1. Field of the Invention

The present invention relates to providing aluminum hitch components. In particular, the present invention relates to systems and methods for using an extrusion, forging, casting and/or machining process to provide aluminum hitch components with increased strength that eliminate encumbrances associated with traditional hitch components.

2. Background and Related Art

Techniques are currently available to manufacture and use hitches that are configured to selectively couple a towing vehicle to a trailer. Originally, the hitch included an elongate body having a proximal end mounted or welded to the frame of the towing vehicle and a distal end coupled to a ball mount. The trailer included a receiving arm having a cavity configured to match the ball mount. The portion of the receiving arm about the ball mount would then be secured to enable the vehicle to tow the trailer. When the user desires to decouple the trailer from the vehicle, the portion of the receiving arm about the ball mount could be selectively unsecured from and lifted off the ball mount, thereby decoupling the vehicle from the trailer.

More recently, hitch adapters have been mounted to the frame of the towing vehicle to selectively remove the hitch from the vehicle. The hitch adapter receives a proximal portion of the hitch, and secures the hitch to the hitch adapter by aligning holes in the hitch adapter and the hitch and placing a secured pin through the holes. When desired, the user may selectively un-secure and pull out the pin, and remove the hitch from the hitch adapter.

Hitches have traditionally been made of steel to provide the strength needed. The individual components have been forged or fabricated and then welded together. While traditional techniques have enabled the manufacturing of hitches for towing purposes, the traditional techniques have resulted in undesirable features. For example, steel rusts. Accordingly, a rusted hitch on a towing vehicle has proven to be undesirable, especially when the towing vehicle is a truck that has been detailed and for which the owner has purchased and provided custom paint, wheels, accessories and/or options. Moreover, the process of rusting has caused the steel hitch to fuse with the hitch adapter, thereby preventing removal of the steel hitch from the hitch adapter. Furthermore, the steel hitch typically includes edges or corners that have caused injury.

Thus, while techniques currently exist that are used to manufacture or otherwise provide a hitch for use in towing, challenges still exist with such techniques. Accordingly, it would be an improvement in the art of manufacturing and/or providing hitches to augment or even replace current techniques with other techniques.

SUMMARY OF THE INVENTION

The present invention relates to providing aluminum hitch components. In particular, the present invention relates to systems and methods for using an extrusion, forging, casting and/or machining process to provide aluminum hitch components with increased strength that eliminate encumbrances associated with traditional hitch components.

Implementation of the present invention takes place in association with extrusion process, a forging process and/or a machining process used in association with an aluminum or aluminum alloy to provide an aluminum hitch component. In an implementation where an extrusion process is used to manufacture a hitch component, a die is provided that includes a configuration. A material, such as an aluminum alloy or other material, is extruded through the die, resulting in an extruded material that is in the extruded shape of the configuration and that may be selectively cut and prepared for use. For example, in one implementation a drop bar is manufactured in accordance with the present invention by extruding an aluminum alloy through a die and then cutting the extruded aluminum alloy material into individual drop bars. The edges and ends of each drop bar are provided a machined radius. Holes are drilled to enable the selective coupling of a ball mount and a lynchpin to a drop bar. Accordingly an extruded hitch is provided that includes increased tensile strength, does not rust, is lighter, and is more appealing to consumers.

While the methods and processes of the present invention have proven to be particularly useful in the area of manufacturing a drop bar using an extrusion process, those skilled in the art will appreciate that the methods and processes of the present invention embrace the use of a variety of different manufacturing processes, such as a forging process, a machining process, etc., to manufacture a variety of different types of hitch components that comprise aluminum and/or an aluminum alloy.

Implementation of the present invention provides a variety of enhanced features and/or characteristics over traditional techniques, including increased strength, ease of use, durability, and the like. Moreover, implementation of the present invention eliminates encumbrances of traditional techniques, including eliminating a tendency to rust and adhere to surfaces.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

In order that the manner in which the above recited and other features and advantages of the present invention are obtained, a more particular description of the invention will be rendered by reference to specific embodiments thereof, which are illustrated in the appended drawings. Understanding that the drawings depict only typical embodiments of the present invention and are not, therefore, to be considered as limiting the scope of the invention, the present invention will be described and explained with additional specificity and detail through the use of the accompanying drawings in which.

DETAILED DESCRIPTION OF THE INVENTION

The present invention relates to providing aluminum hitch components. In particular, the present invention relates to systems and methods for using an extrusion, forging, casting and/or machining process to provide aluminum hitch components with increased strength that eliminate encumbrances associated with traditional hitch components.

Embodiments of the present invention embrace the use of a manufacturing process to provide an aluminum hitch component. The term "aluminum" as provided in the disclosure and in the claims shall refer to any and all types of aluminum, including any and all aluminum alloys. Examples of manufacturing processes include extrusion processes, casting processes, forging processes, machining processes, and/or any other type of process used to provide an aluminum hitch component.

At least some embodiments embrace the use of an extrusion process to manufacture an aluminum hitch component. Accordingly, in at least one embodiment, a die is provided that includes a configuration. A material, such as aluminum, an aluminum alloy or other material, is extruded through the die, resulting in an extruded material that is in the extruded shape of the configuration and that may be selectively cut and prepared for use. Accordingly an extruded aluminum hitch component is provided that includes increased tensile strength, does not rust, is lighter, and is more appealing to consumers.

While the example provided herein relates to an extruded hitch component, those skilled in the art will appreciate that embodiments of the present invention embrace other types of manufacturing processes that may be used in place of or in connection with an extrusion process, including a forging process, a machining process, and the like.

Figure 1:
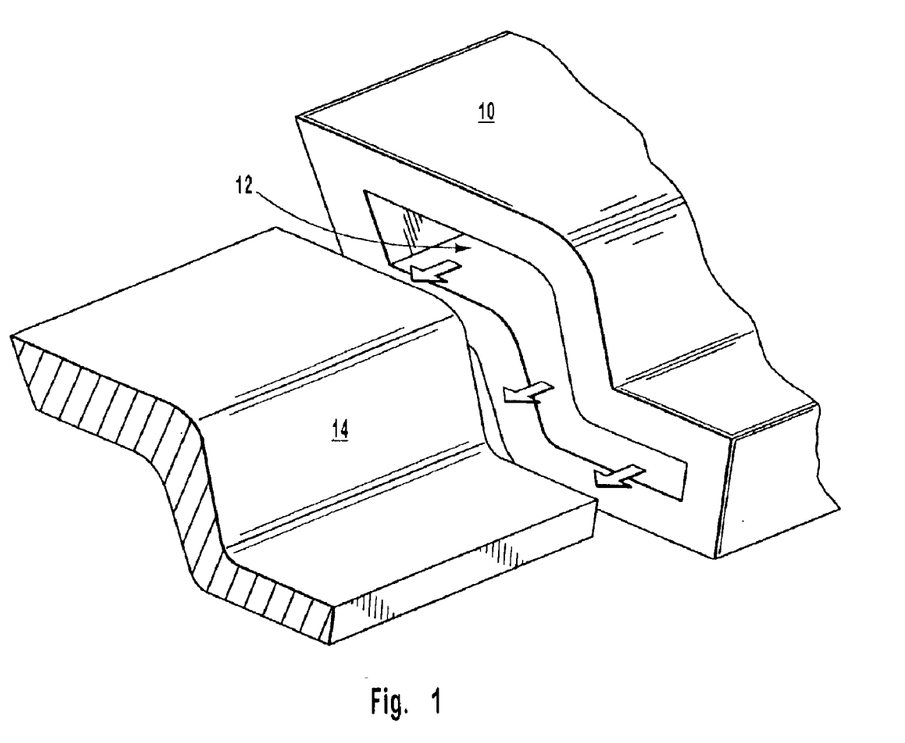
FIG. 1 illustrates a perspective view of a representative embodiment for using an extrusion process to form an aluminum hitch component.

With reference to FIG. 1, a perspective view of a representative embodiment for using a manufacturing process to form an aluminum hitch component is illustrated. In FIG. 1, a die is illustrated as die 10, which includes a configuration or opening 12 that is the size and shape of the intended cross-section of the extruded product or profile. The material is extruded through the die opening 12 to provide an extruded profile 14. In at least one embodiment, the material extruded through the die is aluminum, however those skilled in the art will appreciate that other materials that may be used in accordance with the present invention, wherein the material is forced through a die to obtain a particular shape and would have the strength necessary for use as at least a portion of a hitch component.

The machinability, finishing, and use of the component that is to be manufactured aids in determining the material extruded. Examples of materials used in accordance with the present invention include high strength aluminum alloys, such as 6061-T6, 7075-T6, 7079-T6, 7178-T6, and the like. The aluminum may be directly extruded using a stationary die 10 and a ram (not shown) that forces the aluminum through the opening 12 in the die 10. Alternatively, the aluminum may be indirectly extruded by having a die contained within a hollow ram, which moves into a stationary billet from one end, forcing the aluminum to flow into the ram and acquiring the shape of the opening of the die.

Those skilled in the art will appreciate that a variety of extruded shapes may be produced by a variety of different configurations/shapes of the die openings. Moreover, complex shapes may be obtained using complex openings. In one embodiment, a hydraulic press is used to push the aluminum through the opening of the die.

The pre-extruded aluminum is referred to as the billet, which may be a solid or hollow form. The billet may be cut from a longer length of alloyed aluminum, referred to as a log. The length of the billet varies according to such factors as the desired length of the extruded aluminum or finished profile, the extrusion ratio, the requirements of the extrusion press, and other similar factors.

In one embodiment, the material extruded is an alloy. An alloy is a metallic material that typically comprises more than one metallic element. For example, an aluminum alloy may include small amounts of copper, manganese, silicon, magnesium, zinc, and/or another metal. These elements enhance the natural properties of the aluminum alloy and influence the extrusion process. In one embodiment, the hitch component manufactured through the use of an extrusion process comprises an aircraft quality aluminum alloy. As provided herein, other embodiments of aluminum alloys include high strength aluminum alloys, such as 6061-T6, 7075-T6, 7079-T6, 7178-T6, and the like. Tensile strengths of such alloys typically range from 45–88K per square inch, which is greater than the tensile strength typically experienced by a hitch component. Moreover, Accordingly, with reference to FIG. 1, the billet and extrusion tools are preheated. In one embodiment, the billet is still solid during extrusion, but has been softened by heat. A ram (not shown) applies pressure to the billet. As pressure is first applied, the billet is crushed against the die, becoming shorter and wider until its expansion is restricted by full contact with the container walls. Then, as the pressure increases, the soft but still solid material is forced through the shaped opening 12 of die 10 to emerge on the other side as a fully formed profile 14. Depending on the material used, profile 14 is cooled after emerging from the die, either naturally or through the use of air and/or water quenches. A stretcher (not shown) may be employed, after the profile has been cooled to straighten the extrusion and correct any twisting that may have occurred during or after the extrusion process.

Figure 2:
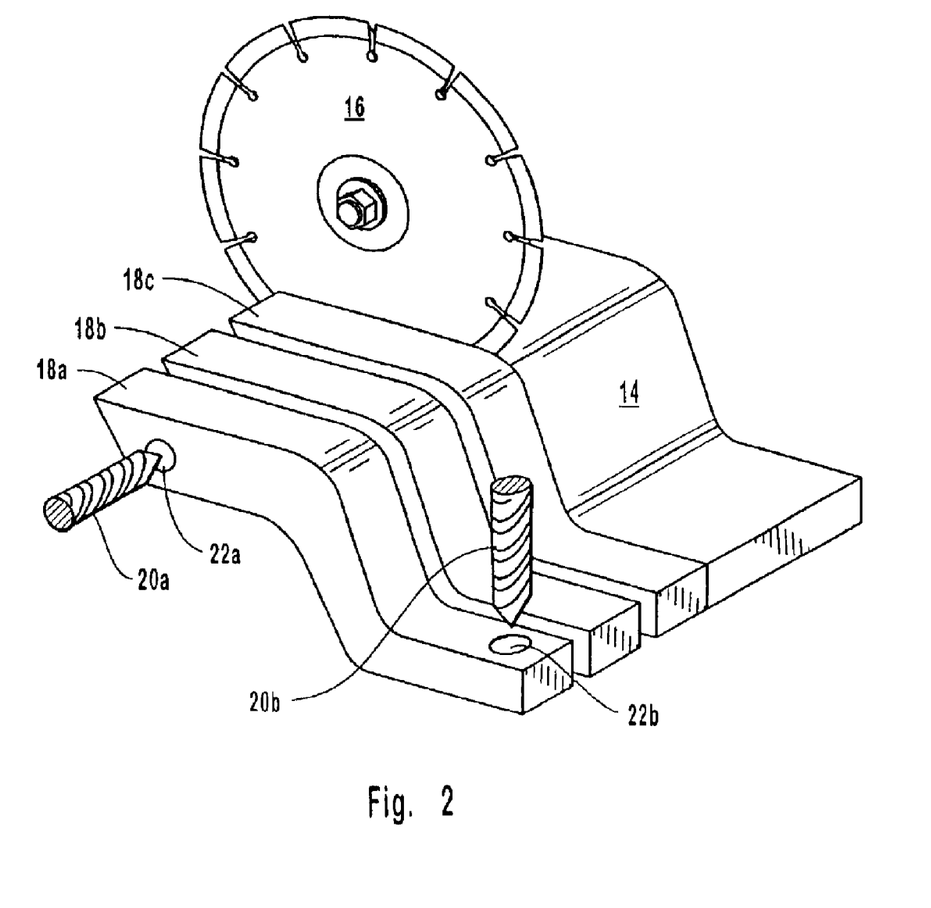
FIG. 2 illustrates a perspective view of a representative embodiment for machining the extruded portion into individual components.

With reference now to FIG. 2, a perspective view of a representative embodiment for machining the extruded portion into individual components is illustrated. A saw 16 may be used to cut profile 14 to the specified individual lengths. In the illustrated embodiment, the profile is cut into individual drop bars, illustrated as drop bars 18a, 18b, and 18c. Those skilled in the art will appreciate that in accordance with embodiments of the present invention hitch components other than drop bars may be produced through the processes provided herein.

In the illustrated embodiment, drop bars 18a, 18b, and 18c are approximately three-inches thick, however those skilled in the art will appreciate that embodiments of the present invention embrace drop bars that are more than three-inches thick or that are less than three-inches thick. In further embodiments, profile 14 and/or drop bars 18a, 18b, and 18c undergo a process of aging to enhance strength, hardness, and elasticity for the specific extrusion alloy.

In one embodiment, the cut profiles are machined or finished. For example, in the illustrated embodiment, drop bars 18a, 18b, and 18c are machined to provide a machine radius on the edges and/or on at least one of the sides. Drills 20 are used to provide holes 22 into the individual drop bars 18. Hole 22a enables the coupling of the drop bar 18a to a hitch adapter (not shown) through the use of a rod that extends through hole 22a and is secured by a cotter pin. Hole 22b enables a ball mount to be coupled to drop bar 18a.

Figure 3:
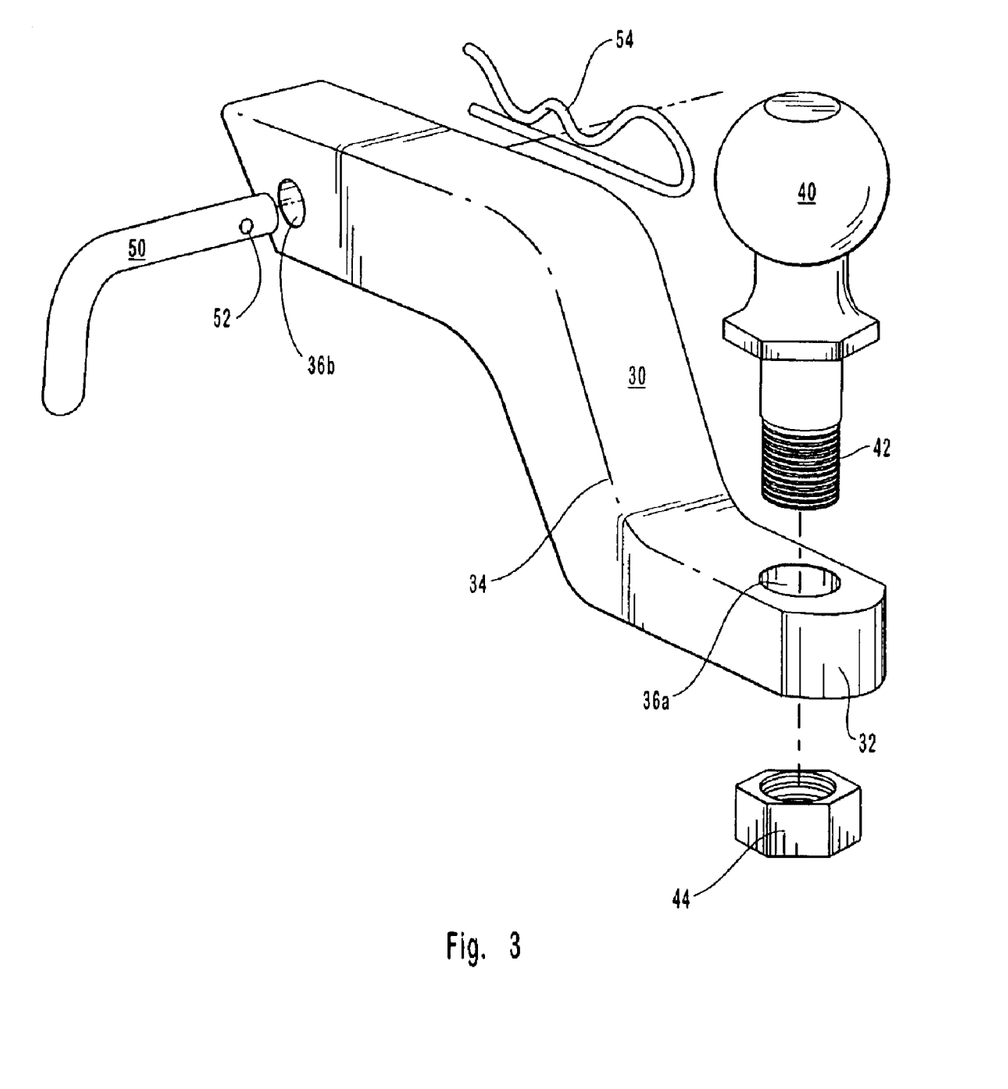
FIG. 3 illustrates an exploded view of an extruded aluminum hitch component.

With reference now to FIG. 3, an exploded view of an extruded drop bar and corresponding components is illustrated. In FIG. 3, drop bar 30 has been cut and machined. Accordingly, distal end 32 and edge 34 includes machine radii. Drop bar 30 also includes holes 36a and 36b. Hole 36a enables the coupling of drop bar 30 a ball mount 40. In the illustrated embodiment, ball mount 40 is secured to drop bar 30 by screwing a nut 44 onto threads 42, as illustrated in FIG. 4.

With reference back to FIG. 3, hole 36b enables the selective coupling of drop bar 30 to a hitch adapter (illustrated as hitch adapter 60 in FIG. 4) through the use of a rod 50 that is secured via a cotter pin 50 that extends through an aperture 52 in rod 50.

Those skilled in the art will appreciate that embodiments of the present invention embrace a variety of shapes and sizes of components, including a drop bar that has a 2-inch, 4-inch, 6-inch, or any other sized drop. Moreover, at least some embodiments embrace a solid component (e.g., drop bar) that fits a standard 2-inch receiver. Moreover, at least some embodiments embrace a hitch component for approximately 10,000–13,000 lb trailer GVWR and approximately 1500–2000 tongue weight. Moreover, the use of aluminum provides a component that is approximately 30% stronger than steel, does not require painting, nor is it inclined to rust. Moreover, a polished finished may be provided.

Figure 4:
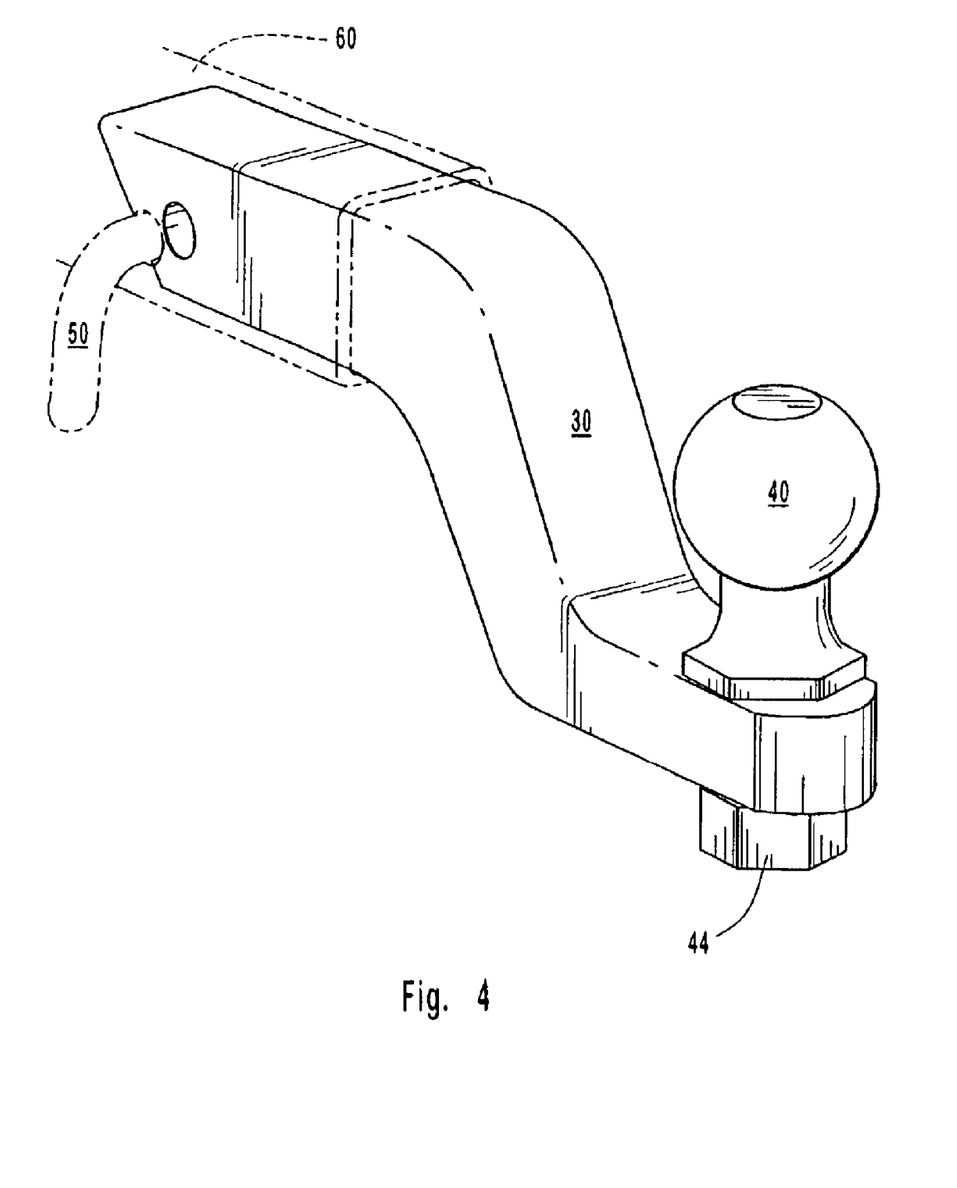
FIG. 4 illustrates a perspective view of the extruded aluminum hitch component coupled to a hitch adapter of a vehicle.

With reference to FIG. 4, a perspective view of the extruded hitch coupled to a hitch adapter of a vehicle is illustrated. Those skilled in the art will appreciate that a hitch component, such as drop bar 30 that comprises aluminum will not rust. In traditional techniques, the coupling of a traditional hitch component that will rust to another surface or piece, such as a hitch adapter, causes the traditional hitch component to fuse to the hitch adapter by the rusting process. As such the user is unable to extract the traditional hitch component from the hitch adapter. However, in accordance with at lease some embodiments of the present invention, drop bar 30 will not fuse to hitch adapter 60 because the aluminum does not rust. Accordingly, embodiments of the present invention facilitate use because they eliminate traditional encumbrances (e.g., undesirable rusting, fusing, and the like). Moreover, at least some embodiments of the present invention are lighter and/or stronger than traditional hitch components because of the use of aluminum.

In some embodiments of the present invention, a matt finish or a polish is provided to the aluminum hitch component.

While the illustrated example relates to an extruded drop bar, those skilled in the art will appreciate that embodiments of the present invention embrace all types of components that may be used in association with a hitch, wherein the components include aluminum and undergo a manufacturing process, such as an extrusion process, a forging process, a casting process and/or a machining process. Additional examples of hitch components are illustrated in FIGS. 5–8.

Figure 5:
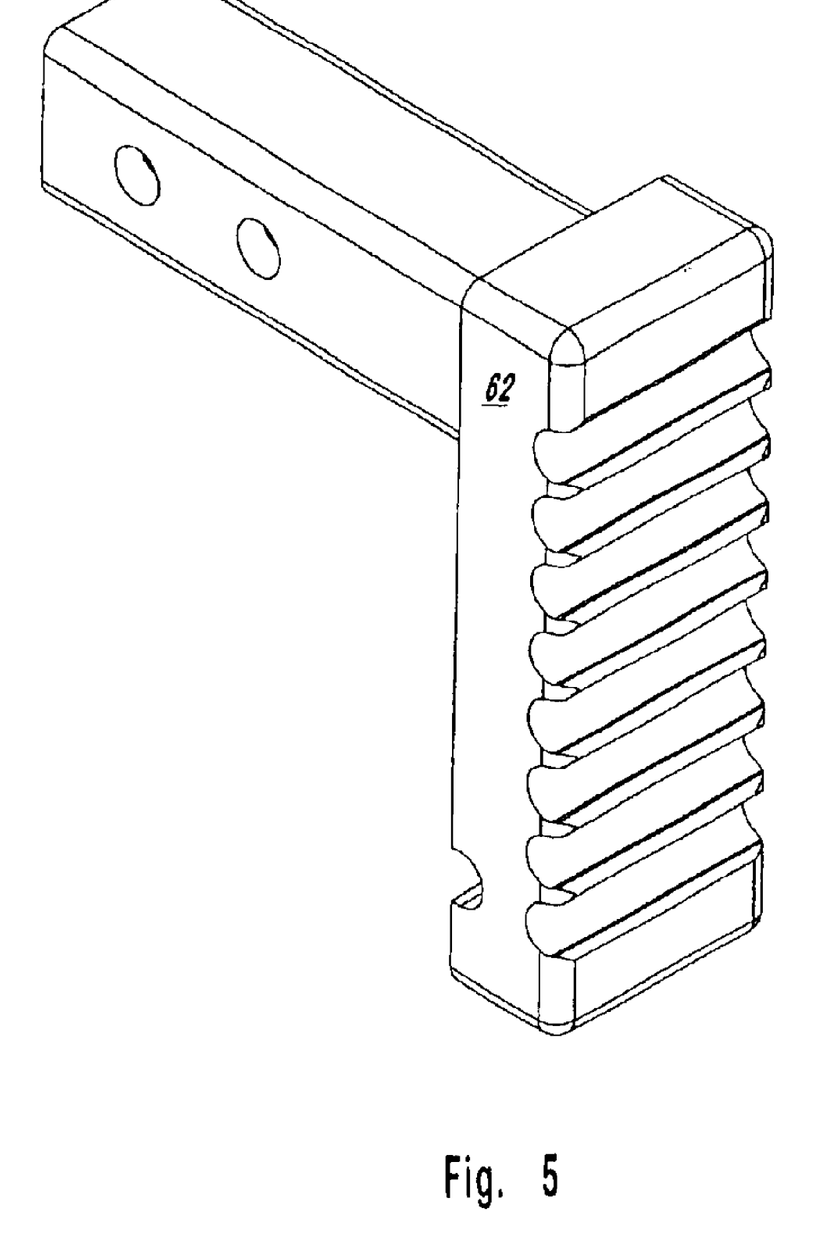
FIG. 5 illustrates another representative aluminum hitch component in accordance with the present invention.

With reference to FIG. 5, receiver 62 is another representative example of a hitch component for manufacture in accordance with the present invention. Receiver 62 includes aluminum and is formed from a manufacturing process, such as an extrusion process, a forging process, a casting process and/or a machining process.

Figure 6:
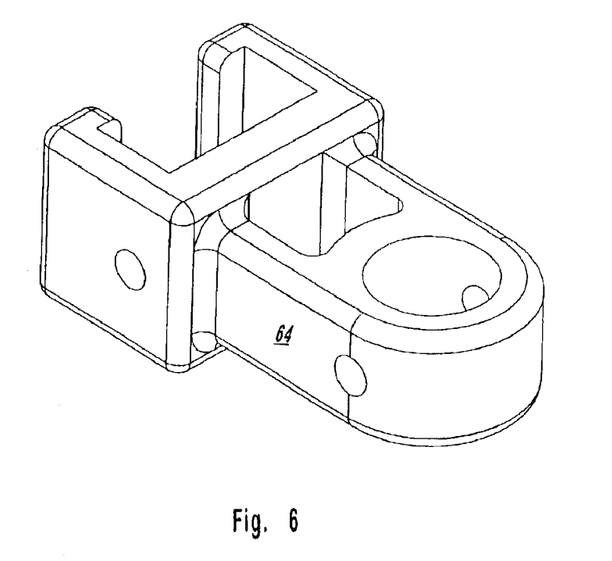
FIG. 6 illustrates another representative aluminum hitch component in accordance with the present invention.

With reference to FIG. 6, adjustable sleeve 64 is another representative example of a hitch component for manufacture in accordance with the present invention. Adjustable sleeve 64 includes aluminum and is formed from a manufacturing process, such as an extrusion process, a forging process, a casting process and/or a machining process.

Figure 7:
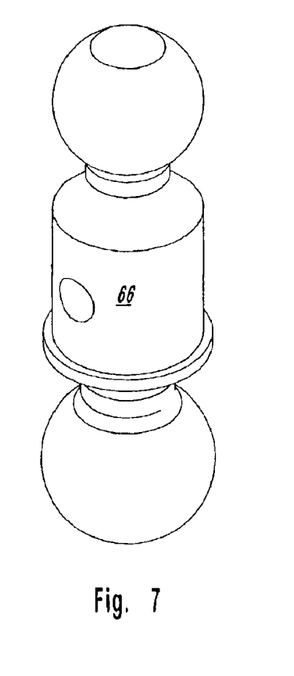
FIG. 7 illustrates another representative aluminum hitch component in accordance with the present invention.

With reference to FIG. 7, ball component 66 is another representative example of a hitch component for manufacture in accordance with the present invention. Ball component 66 includes aluminum and is formed from a manufacturing process, such as an extrusion process, a forging process, a casting process and/or a machining process.

A combination of the components illustrated in FIGS. 5–7 provide a hitching system that provides adjustment in both raised and downward positions. In one embodiment, the adjustment allows for up to approximately 12-inches of vertical adjustment. Moreover, double reversible balls offer a choice between typical sizes, such as a 2-inch ball, a 2⁵⁄₁₆-inch ball, a 1⅞-inch ball.

Figure 8:
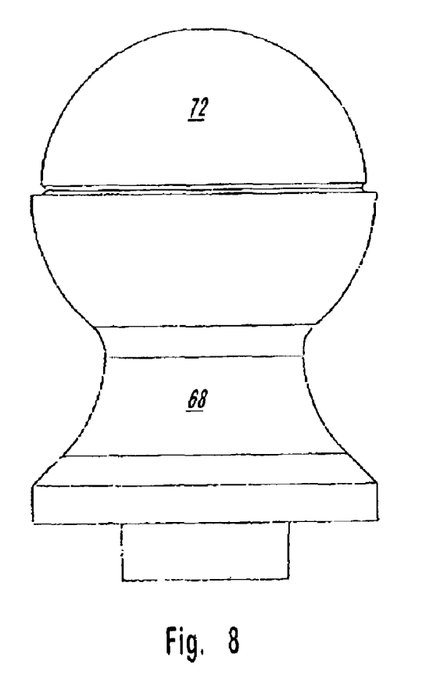
FIG. 8 illustrates another representative aluminum hitch component in accordance with the present invention.

With reference to FIG. 8, ball 68 is another representative example of a hitch component for manufacture in accordance with the present invention. Ball 68 includes aluminum and is formed from a manufacturing process, such as an extrusion process, a forging process, a casting process and/or a machining process.

Figure 9:
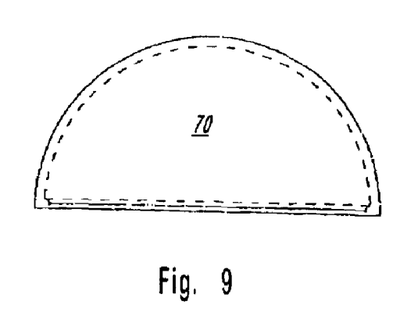
FIG. 9 illustrates a representative cap that is configured for association with the embodiment of FIG. 8.

With reference to FIG. 9, cap 70 comprises a polymer, an elastomer, a nylon, or another material or combination of materials. For example in one embodiment, the cap comprises a nylon that includes graphite to eliminate or prevent ultraviolet radiation and to add lubricity to the nylon. Cap 70 is configured to be associated with hemisphere 72 of ball 68. When cap 70 is coupled to at least a portion of ball 68, such as hemisphere 72, a greaseless ball to facilitate use of ball 68 with a corresponding trailer hitch receiver. The use of cap 70 eliminates and/or reduces the need for grease. In one embodiment, cap 70 lasts a lifetime for a user.

While the illustrated embodiment of FIG. 9 provides a cap that covers a hemisphere (e.g., hemisphere 72) of a hitch component (e.g. ball 68), those skilled in the art will appreciate that embodiments of the present invention embrace more than a hemisphere or less than a hemisphere. In at least one embodiment, a cap that comprises a polymer, an elastomer, a nylon, or another material or combination of materials covers all or most of a ball portion (sphere), down to a neck portion, of a hitch component having a ball portion coupled to a neck portion.

In one embodiment, the cap is injection molded onto at least a portion of a ball/sphere. In a further embodiment, the material is injected at approximately 500° and then the cap cools and typically shrinks. In one embodiment, the ball/sphere is preheated. In another embodiment, the material (e.g. nylon) is soaked in water or in another aqueous solution. For example, the nylon is soaked in water for 24 hours at 140° to hydrate the nylon. The nylon absorbs water and causes the nylon to have a tougher and more durable characteristic.

Thus, embodiments of the present invention embrace providing aluminum hitch components. In particular, embodiments of the present invention relates to systems and methods for using an extrusion, forging, casting and/or machining process to provide aluminum hitch components with increased strength that eliminate encumbrances associated with traditional hitch components. Embodiments of the present invention provide a hitch that does not rust and therefore will not permanently adhere to a hitch adapter, is stronger, and is more aesthetically desirable.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method for manufacturing drop bars that are configured to be coupled to vehicles for towing, the method comprising;

extruding billet aluminum through a die to form a profile in a shape of an extended drop bar;

cutting the extended drop bar profile to provide a plurality of drop bars that are configured to be coupled to vehicles for towing; and machining a first drop bar to configure a receiving portion that is configured to receive a ball for coupling thereto, wherein the first drop bar is one of the plurality of drop bars.

2. A method as recited in claim 1, wherein the aluminum is an aluminum alloy.

3. A method as recited in claim 1, wherein the step for machining comprises drilling an aperture through the first drop bar.

4. A method as recited in claim 3, further comprising a step for machining the first drop bar to create a radius on a portion of the first drop bar.

5. A method as recited in claim 4, wherein the portion is a proximal end of the first drop bar.

6. A method as recited in claim 4, wherein the portion is an edge of the first drop bar.

7. A method as recited in claim 3, wherein the ball is removably coupled to the first drop bar.

8. A method as recited in claim 1, wherein the first drop bar is configured to be removably coupled to a vehicle.

9. A method as recited in claim 1, wherein the ball comprises a polymer.

10. A method as recited in claim 1, wherein the ball comprises an elastomer.

11. A method for manufacturing a stepped drop bar that is configured to be selectively coupled to a vehicle for use in towing, the method comprising:

extruding billet aluminum through a die to form a profile in a shape of an extended and stepped drop bar;

cutting a plurality of parallel cuts through the extended and stepped drop bar profile to provide a plurality of drop bars;

machining near a proximal end of a first stepped drop bar to configure a receiving portion that is configured to receive a ball for coupling thereto, wherein the first drop bar is one of the plurality of drop bars; and machining near a distal end of the first stepped drop bar to configure the first stepped drop bar to be selectively coupled to a vehicle for use in towing.

12. A method as recited in claim 11, wherein the aluminum is an aluminum alloy.

13. A method as recited in claim 11, wherein the step for machining near a distal end comprises drilling an aperture through the first stepped drop bar.

14. A method as recited in claim 11, where the step for machining near a proximal end comprises drilling an aperture through the first stepped drop bar.

15. A method as recited in claim 14, further comprising a step for machining the first stepped drop bar to create a radius at the proximal end of the first stepped drop bar.

16. A method as recited in claim 11, wherein the ball is removably coupled to the first stepped drop bar.

17. A method as recited in claim 11, wherein the ball comprises a polymer.

18. A method as recited in claim 11, wherein the ball comprises an elastomer.

* * * * *